Nov. 29, 1949   H. D. BLAKE   2,489,556
INTERNAL LARDER
Filed Jan. 30, 1946
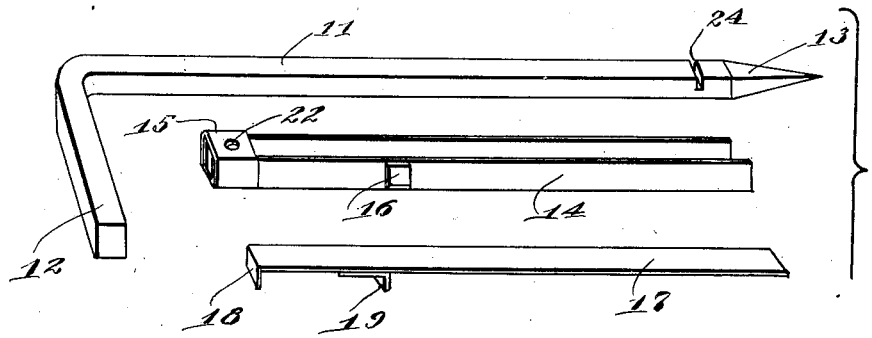
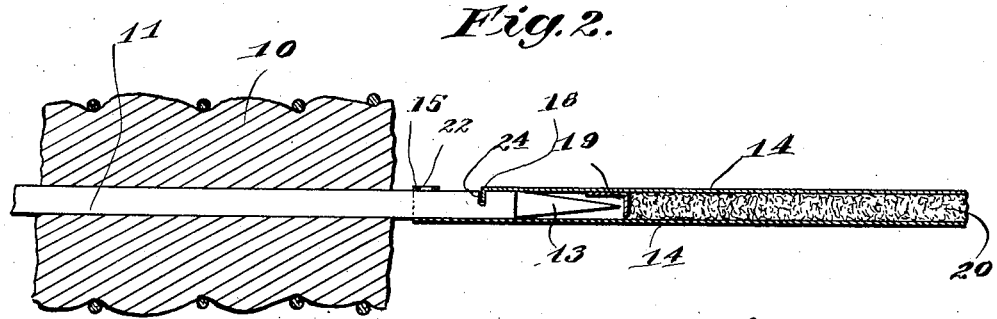
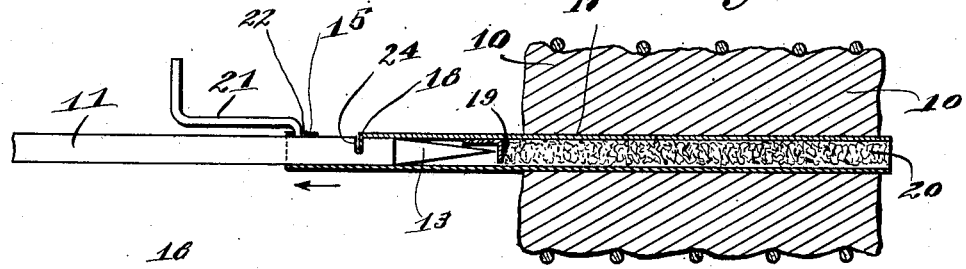
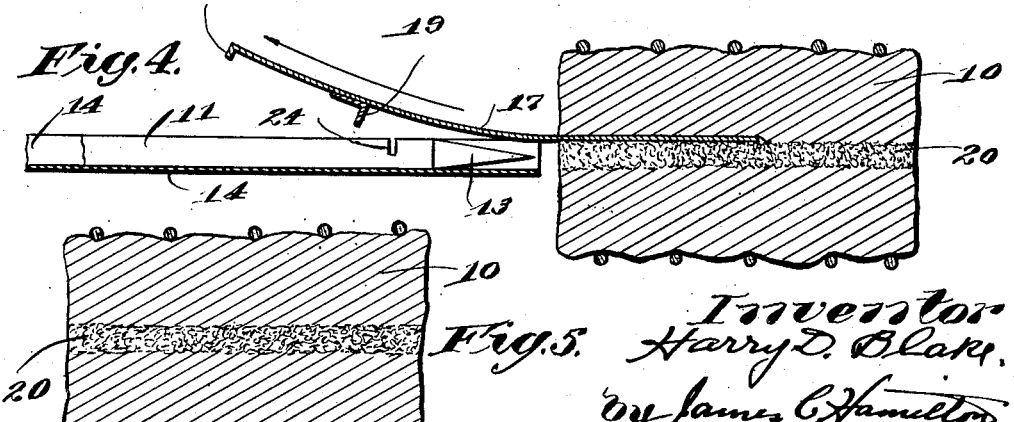
Inventor
Harry D. Blake,
by James C. Hamilton
Atty Patented Nov. 29, 1949

2,489,556

UNITED STATES PATENT OFFICE 2,489,556

INTERNAL LARDER

Harry D. Blake, Roxbury, Mass.

Application January 30, 1946, Serial No. 644,343

1 Claim. (Cl. 17—42.1)

My present invention relates to inside larders or more specifically apparatus for placing ground or stripped fat inside of rolled and tied meats after the meats have been rolled and tied.

The principal object of my invention is an improved means for placing fat inside rolled meats;

Another object is an inside larder which is simple of construction and easily operated, and Other objects and novel features comprising the construction and operation of my device will be apparent as the description of the same progresses.

In the drawings illustrating the preferred embodiment of my invention:

Fig. 1 is a perspective view of the three main parts of the larder prior to assembly;

Fig. 2 is a cross-section and elevation of the device assembled and loaded with fat just prior to being drawn through a piece of meat;

Fig. 3 is a fragmentary cross-section similar to Fig. 2 just after having been drawn through the meat;

Fig. 4 is another fragmentary cross-section of the larder showing a continuation of the operation shown in Fig. 3, and Fig. 5 is a cross-section of a unit of rolled meat after the final removal of the larder equipment showing the fat deposited inside of the meat.

It is a well-known fact that roasted or otherwise cooked meats which are of themselves mostly free of fat must have fat cooked with the meats if best results are to be obtained. In tightly rolled lean meats it is very difficult and practically impossible to cook externally applied fat into the central portion of the meat rolls.

With the present equipment such fat may be placed in the rolled meat 10 in the proper position after the meat is rolled and tightly tied up. To accomplish this result I have provided a needle member indicated at 11 the rear end 12 of which is bent at right-angles to form a handle. The front end of the needle is pointed as at 13 and a slot 24 is provided in the rear area of the sharpened end.

For practical purposes I have made the needle from square stock, as shown in Fig. 1.

The first operation consists in piercing the meat roll 10 with the needle 11 until the pointed end extends through the meat roll and projects from the other end to an extent shown in Fig. 2. A trough member 14, shown in perspective in Fig. 1, is provided with closed end 15. This trough 14 is now filled with ground, stripped or otherwise prepared fat all the way from the right end to a point approximately opposite the gauge strip 16 which is attached to the side of the trough. The closed end of the trough is now slid over the pointed end of the needle 11 as shown in Fig. 2. A trough cover member 17, also shown in perspective in Fig. 1, is provided with a back end bent over at ninety degrees to the top blade to form a projecting member 18 which is now fitted into the slot 24 in the needle 11. In front of the member 18 is positioned another projection member 19. This member 19 when in place in the trough 14 is approximately behind the gauge strip 16 located on the outside of the said trough, the reason for which will be made clear further along the description. These projection members 18 and 19 act as stop members. The projection member 18 not only anchors the cover 17 against longitudinal movement with respect to the needle 11 but at the same time acts as a stop against which the closed end piece 15 of the trough member bears when the apparatus is withdrawn to the left. The projection member 19 acts as a pusher against the fat 20 which is held when the apparatus is withdrawn to the left.

As shown in Fig. 2, the apparatus is loaded and ready for the next step which consists in pulling the whole apparatus through the meat roll 10 to the left. Fig. 3 shows this operation having been completed and in the act of removing the trough member 14. Just prior to the backward movement of the trough member 14 on the needle 11, as shown in Fig. 3, the gauge member 16 has emerged from the meat roll 10 which indicates that the projection member 19 is through the meat roll 10 in the position shown in Fig. 3. The operator thus knows that the fat matter 20 extends all the way through the meat roll 10.

Fig. 3 shows the apparatus just after the operation of removing the trough member has started. Just prior to this backward movement of the trough member 14 the closed end portion 15 of the trough member was backed up against the projection member 18 of the cover 17. In this operation of removing the trough member 14, a hook member 21, which may be of any design having a more or less right angle projection as shown in Fig. 3, is inserted in an opening 22 located in the closed portion of the trough 14 and while the needle 11 is firmly held in the meat roll 10 the trough is pulled back, in the direction of the arrow, until it completely emerges from the meat roll, as shown in Fig. 4. After the trough 14 is removed the cover member 14 is lifted up from the slot 24 in the needle 11 and withdrawn in the direction of the arrow, as shown in progress, in Fig. 4. When the trough 14 is withdrawn, as shown in Fig. 3, the cover member 17 remains in the position shown in Fig. 3 and the projection member 19 attached to the cover acts as a stop member to hold the fat 20 in place and push it out of the trough 14 which is being withdrawn. In Fig. 4 the final operation is being performed in which the cover member 14 is being withdrawn from the meat roll 10. Fig. 10 shows the final results in which the fat 20 is in place within the meat roll 10 ready for cooking.

It should be understood that depending on the size of the meat roll any number of insertions of fat may be made in the roll but for the purpose of the present application one is enough. Other modifications may be made and still be within the spirit of the appended claim.

Having thus described my invention, what I claim as new is:

An internal larder for rolled meats comprising, a needle member having a right-angled handle portion on one end and a pointed piercing end with a transverse slot located across said member back of said pointed piercing end, a trough member slidably engaged on said needle member having an open side, a cover member engageable on said trough member, said cover member having a projection member on one side extending into said trough member in front of the piercing end of said needle member, and an engaging member located on said cover member engaging in said transverse slot in said needle member.

HARRY D. BLAKE.

REFERENCES CITED

The following references are of record in the file of this patent:

UNITED STATES PATENTS

| Number | Name | Date |
| --- | --- | --- |
| 711,578 | Means | Oct. 21, 1902 |
| 845,151 | Weber | Feb. 26, 1907 |